(12) United States Patent
Dorairaj et al.

(10) Patent No.: US 12,197,413 B2
(45) Date of Patent: Jan. 14, 2025

(54) DISTRIBUTED IN-DATABASE VECTORIZED OPERATIONS USING USER DEFINED TABLE FUNCTIONS

(71) Applicant: Snowflake Inc., Bozeman, MT (US)

(72) Inventors: Pradeep Dorairaj, Fremont, CA (US); Garrett Frere, Long Island City, NY (US)

(73) Assignee: Snowflake Inc., Bozeman, MT (US)

(*) Notice: Subject to any disclaimer, the term of this patent is extended or adjusted under 35 U.S.C. 154(b) by 0 days.

(21) Appl. No.: 18/461,959

(22) Filed: Sep. 6, 2023

(65) Prior Publication Data

US 2024/0256515 A1 Aug. 1, 2024

Related U.S. Application Data

(60) Provisional application No. 63/481,844, filed on Jan. 27, 2023.

(51) Int. Cl.
*G06F 16/20* (2019.01)
*G06F 16/22* (2019.01)

(52) U.S. Cl.
CPC .................. *G06F 16/2291* (2019.01)

(58) Field of Classification Search
CPC .......... G06F 16/2291; G06F 16/2462
See application file for complete search history.

(56) References Cited

U.S. PATENT DOCUMENTS

| 10,677,823 | B2* | 6/2020 | Ferguson | G01R 31/42 |
| 11,347,527 | B1* | 5/2022 | Brossard | G06F 16/2465 |
| 11,561,946 | B1* | 1/2023 | Jiang | G06N 7/01 |
| 2015/0223863 | A1* | 8/2015 | Ghosh | A61B 5/7246 606/34 |
| 2023/0131029 | A1* | 4/2023 | Ezrielev | G06F 16/27 707/737 |

FOREIGN PATENT DOCUMENTS

| CN | 106980905 B * | 7/2020 | G06Q 10/04 |
| WO | WO-2022110557 A1 * | 6/2022 | G01R 35/04 |

* cited by examiner

*Primary Examiner* — Mahesh H Dwivedi
(74) *Attorney, Agent, or Firm* — Schwegman Lundberg & Woessner, P.A.

(57) ABSTRACT

The subject technology receives a set of values for a data set corresponding to a request for determining a Pearson correlation. The subject technology determines a number of rows from the data set. The subject technology determines a number of execution nodes to execute the request. The subject technology determines a set of shards of rows from the data set. The subject technology, for each shard from the set of shards, sends a particular user defined table function (UDTF), including a particular shard of rows, to a different execution node to perform a set of operations. The subject technology provides a set of output values of each particular UDTF corresponding to each shard from the set of shards in a second UDTF. The subject technology sends the second UDTF to a particular execution node to perform an aggregate operation using the set of output values of each particular UDTF.

30 Claims, 8 Drawing Sheets

$$600 \longrightarrow \rho_{x,y} = \operatorname{corr}(X,Y) = \frac{\operatorname{cov}(X,Y)}{\sigma X \sigma Y} = \frac{E[(X-\mu x)(Y-\mu y)]}{\sigma X \sigma Y}, \text{ if } \sigma X \sigma Y > 0.$$

$$620 \longrightarrow \rho_{x,y} = \frac{E(XY) - E(X)E(Y)}{\sqrt{E(X^2) - E(X)^2} \cdot \sqrt{E(Y^2) - E(Y)^2}}$$

$$640 \longrightarrow \rho_{x,y} = \frac{\operatorname{dot}\left(\frac{x}{\sqrt{n}}, \frac{y}{\sqrt{n}}\right) - \operatorname{sum}\left(\frac{x}{n}\right)\operatorname{sum}\left(\frac{y}{n}\right)}{\sqrt{\operatorname{sum}\left(\left(\frac{x}{\sqrt{n}}\right)^2\right) - \left(\operatorname{sum}\left(\frac{x}{n}\right)\right)^2} \cdot \sqrt{\operatorname{sum}\left(\left(\frac{y}{\sqrt{n}}\right)^2\right) - \left(\operatorname{sum}\left(\frac{x}{n}\right)\right)^2}}$$

*FIG. 6*

DISTRIBUTED IN-DATABASE VECTORIZED OPERATIONS USING USER DEFINED TABLE FUNCTIONS

CROSS-REFERENCE TO RELATED APPLICATIONS

This application claims priority to U.S. Provisional Patent Application Ser. No. 63/481,844, filed Jan. 27, 2023, entitled "DISTRIBUTED IN-DATABASE VECTORIZED OPERATIONS USING USER DEFINED TABLE FUNCTIONS," and the contents of which is incorporated herein by reference in their entirety for all purposes.

TECHNICAL FIELD

The present disclosure relates to systems, methods, and devices for databases and more particularly relates to vector processing in connection with database systems.

BACKGROUND

Databases are widely used for data storage and access in computing applications. Databases may include tables having rows and columns that include or reference data that can be read, modified, or deleted using queries.

Tasks or commands can be executed on database data to manipulate or alter the data. Such tasks can be requested by a client account and may manipulate database data to make it more useful for the client account. In certain implementations, it may be beneficial to schedule the automatic execution of certain tasks to streamline database systems.

BRIEF DESCRIPTION OF THE DRAWINGS

The present disclosure will be understood more fully from the detailed description given below and from the accompanying drawings of various embodiments of the disclosure.

FIG. 6 illustrates examples of notation for determining correlation between two columns of a table.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

Systems, methods, and devices are described herein for producing a Pearson correlation matrix, which is a metric of correlation, using a network-based database system. As described further herein, the summations in the Pearson product-moment formula are decomposed to linear algebra based dot products. The dot products can then be chained with vector chaining thereby solving multiple pieces of correlation at a time. This decomposition is coupled with a use of a user defined table function (UDTF) to implement distribution vector chained matrix operations effectively wielding distributed computing resources. Accessing a vector space(s) necessary for efficient mathematical calculations for a Pearson correlation can be very challenging in traditional database settings where access is by row, multi-row, column, or two columns. In comparison, vectors are more arbitrary structures and could involve multi row or multi-column access to form and operate against. The subject technology as described further herein advantageously enables vector processing using a network-based database system.

Figure 1:
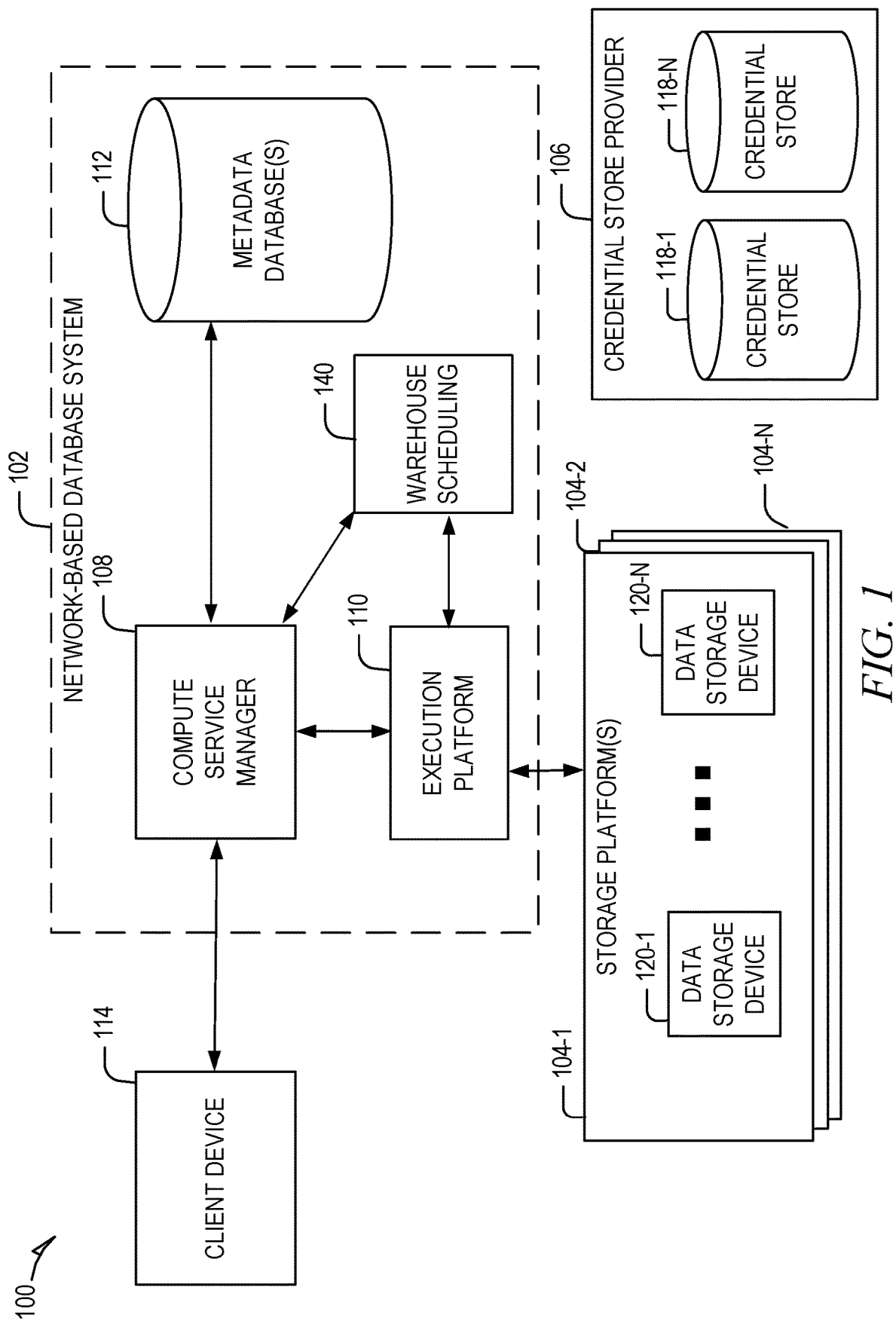
FIG. 1 illustrates an example computing environment that includes a network-based database system in communication with a cloud storage platform, in accordance with some embodiments of the present disclosure.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104-1 (e.g., AWS S3®, Microsoft Azure Blob Storage®, or Google Cloud Storage), and a cloud credential store provider 106 that stores credentials in one of the remote credential stores 118-1 to 118-N. The network-based database system 102 is a network-based system used for reporting and analysis of integrated data from one or more disparate sources including one or more storage locations within the cloud storage platform 104-1. The cloud storage platform 104-1 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104-1) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 120-1 to 120-N, and each other storage platform can also include multiple data storage devices. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like. Similarly, any of the data storage devices in other storage platforms as discussed further herein can also have similar characteristics described above in connection with storage platform 104-1.

In an embodiment, each storage platform can provide a different domain or type of storage. For example, storage platform 104-1 may provide storage for a database that stores tables using micro-partitions as discussed further herein, and storage platform 104-2 may provide storage for linearizable storage corresponding to a distributed database (e.g., FoundationDB) that stores tables in a key-value format. Thus, in an implementation, different storage platforms can be utilized for cross domain transactions against different types of databases as discussed further below. In another embodiment, the same storage platform can be utilized for such cross domain transactions where different data storage devices (e.g., data storage device 120-1 and data storage device 120-N) can be utilized for a first type of database (database tables based on micro-partitions) and a second type of database (e.g., linearizable storage tables).

As shown in FIG. 1, the data storage devices 120-1 to 120-N are decoupled from the computing resources associated with the execution platform 110. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104-1, are shown in FIG. 1 as individual discrete components. However, each of the compute service manager 108, metadata database(s) 112, execution platform 110, and storage platform 104-1 may be implemented as a distributed system (e.g., distributed across multiple systems/platforms at multiple geographic locations). Additionally, each of the compute service manager 108, metadata database(s) 112, execution platform 110, and storage platform 104-1 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104-1. It is desirable to retrieve as much data as possible from caches within the execution platform 110 because the retrieval speed is typically much faster than retrieving data from the cloud storage platform 104-1.

As shown in FIG. 1, the network-based database system 102 includes a warehouse scheduling component 140 that implements scheduling of jobs or transactions involving queries (e.g., compiled query plans), according to some embodiments. In an example, the warehouse scheduling component 140 receives a job that may be divided into one or more discrete transactions, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform.

The warehouse scheduling component 140 may assign the job, including the multiple discrete transactions, to a particular virtual warehouse of the execution platform 110. Based on this assignment, the warehouse scheduling component 140 can send the job, including the multiple discrete transactions, to the assigned virtual warehouse for execution. Alternatively, the warehouse scheduling component 140 can send a subset of the transactions included in the job for execution by the execution platform 110.

In an embodiment, as described further herein, the warehouse scheduling component 140 can perform operations to process transactions (e.g., OLTP) that may be executing concurrently, while handling conflicts and avoiding starvation of resources. As further shown, the execution platform 110 communicates with the storage platform 104, which provides a distributed database (e.g., FoundationDB, and the like), where data can be read and written in connection with performing the transactions.

In an embodiment, the warehouse scheduling component 140 schedules and manages the execution of transactions on behalf of a client account. The warehouse scheduling component 140 may schedule any arbitrary SQL query included in a given transaction.

In embodiments, the compute service manager 108 is also coupled to one or more metadata databases 112 that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enables the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

As shown in FIG. 1, the computing environment 100 separates the execution platform 110 from the storage platform 104-1. In this arrangement, the processing resources and cache resources in the execution platform 110 operate independently of the data storage devices 120-1 to 120-N in the cloud storage platform 104-1. Thus, the computing resources and cache resources are not restricted to specific data storage devices 120-1 to 120-N. Instead, all computing resources and all cache resources may retrieve data from, and store data to, any of the data storage resources in the cloud storage platform 104-1.

Figure 2:
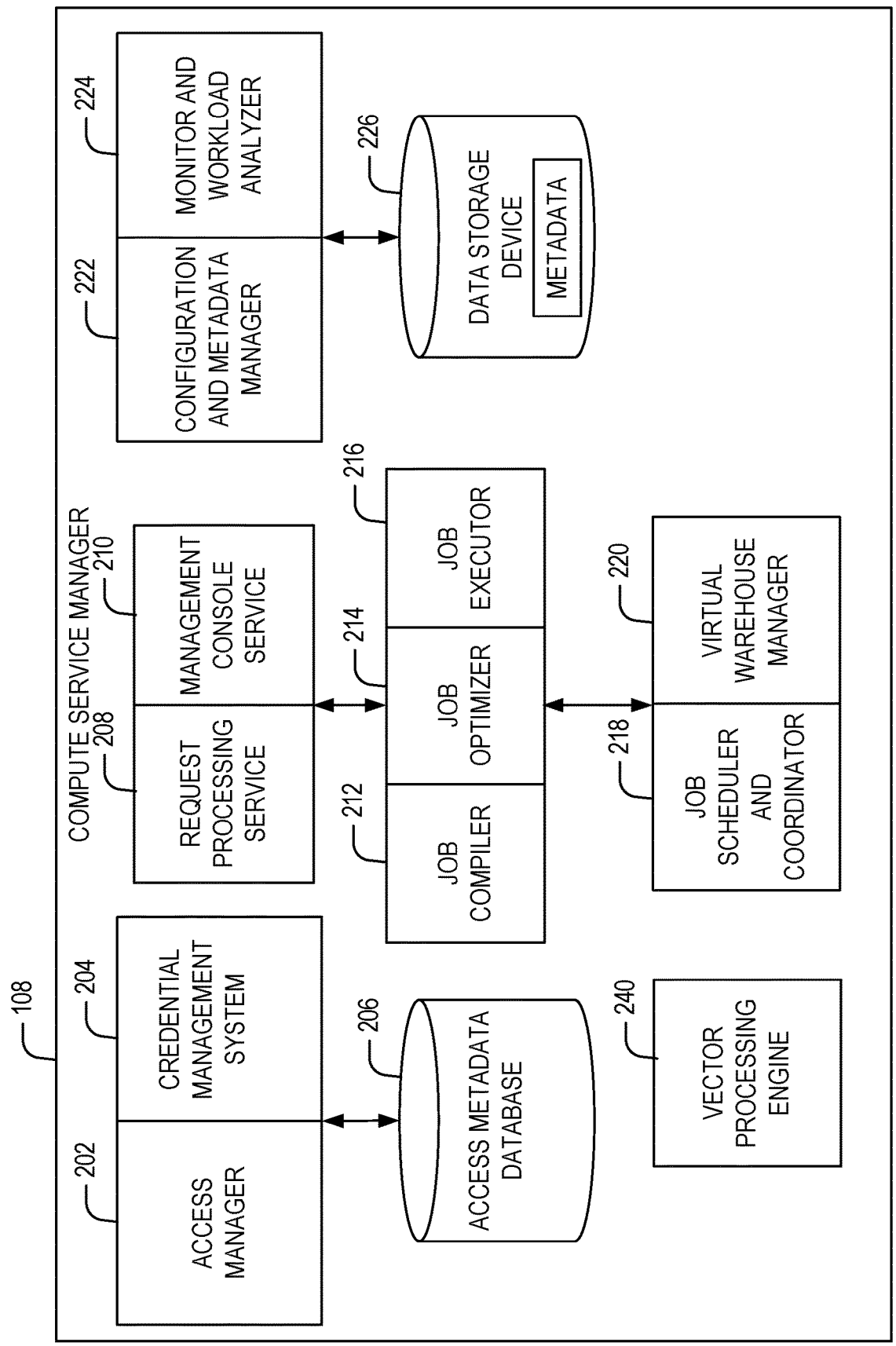
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104-1.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104-1) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104-1, or any other storage device.

As further shown, compute service manager 108 includes vector processing engine 240. In an example, vector processing engine 240 performs vector sharding and chaining to enable vector execution across multiple virtual warehouses or execution nodes. As described herein, such vector execution can determine various metrics including, for example, covariance and correlation. Although vector processing engine 240 is shown as a separate component in the example of FIG. 2, in an embodiment, vector processing engine 240 is a component provided by job scheduler and coordinator 218.

Figure 3:
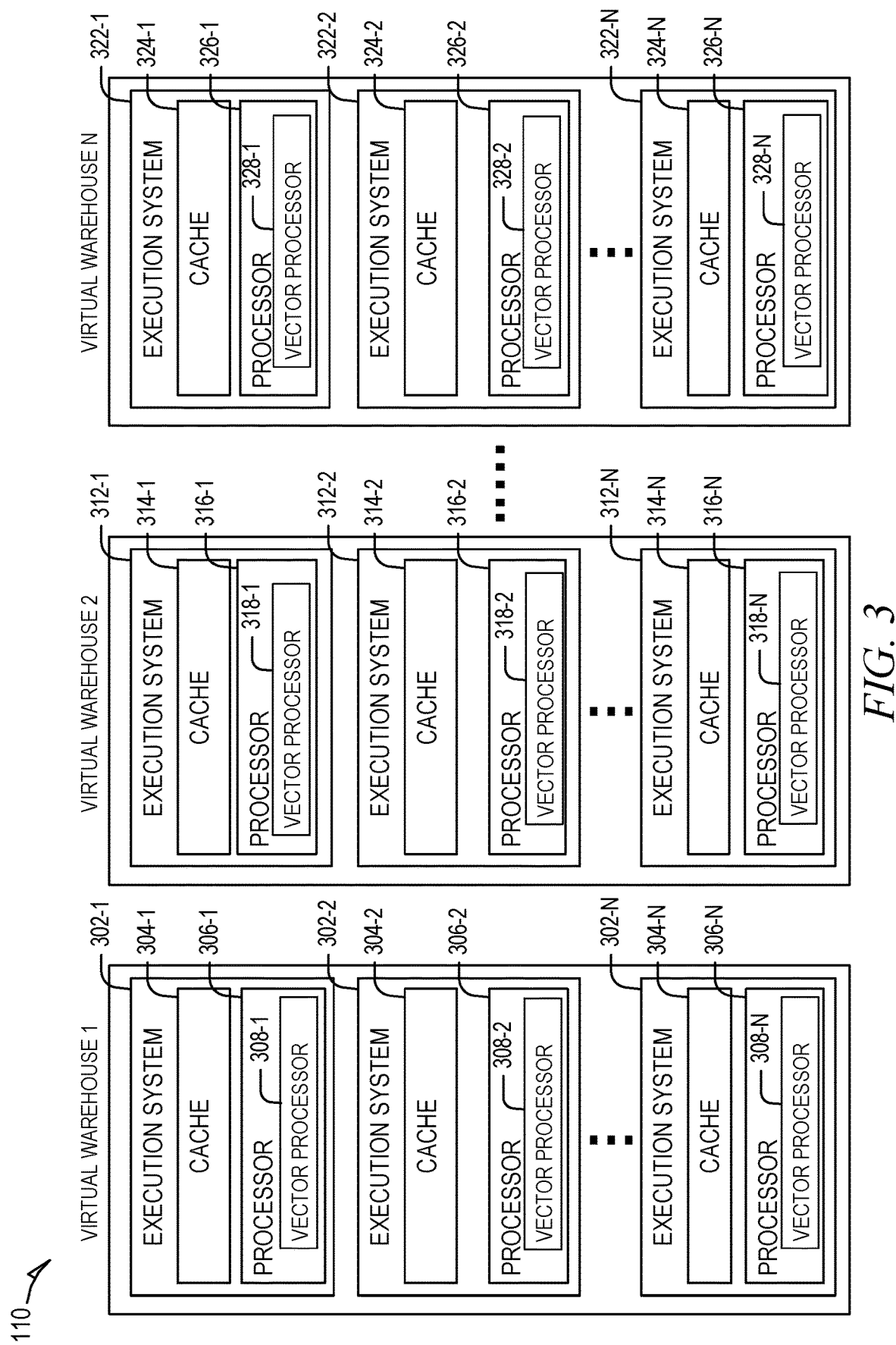
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104-1).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104-1. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

As further shown, processor 306-1 includes vector processor 308-1, processor 306-2 includes vector processor 308-2, and processor 306-N includes vector processor 308-N. Processor 316-1 includes vector processor 318-1, processor 316-2 includes vector processor 318-2, and processor 316-N includes vector processor 318-N. Processor 326-1 includes vector processor 328-1, processor 326-2 includes vector processor 328-2, and processor 326-N includes vector processor 328-N. In an implementation, each of the aforementioned vector processors are implemented to execute a vector input (e.g., a vector shard) in a single instruction. Although each vector processor is shown as being included within a particular processor, it is appreciated that, alternatively, a given vector processor may be provided as a separate (e.g., specialized) processor to perform vector execution by an execution node.

As discussed further herein, each vector processor can perform vector execution of a given vector shard in a single instruction as part of a distributed approach for performing a set of vector operations (e.g., vector scalar operations) across multiple execution nodes. In this manner, improvements in the execution of the subject system are provided (e.g., by at least reducing utilization of computing resources).

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104-1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104-1.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104-1, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

As discussed herein, embodiments of the subject technology produce a Pearson correlation matrix, which is a metric of correlation, using network-based database system 102. As described further herein, the summations in the Pearson product-moment formula are decomposed to linear algebra based dot products. The dot products can then be chained with vector chaining thereby solving multiple pieces of correlation at a time. This decomposition is coupled with a use of user defined table function (UDTF) to implement distribution vector chained matrix operations effectively wielding distributed computing resources. Accessing a vector space(s) necessary for efficient mathematical calculations for a Pearson correlation can be very challenging in traditional database settings where access is by row, multi-row, column, or two columns. In comparison, vectors are more arbitrary structures and could involve multi row or multi-column access to form and operate against. The subject technology advantageously enables vector processing using network-based database system 102, and more specifically using vector processing engine 240 (e.g., provided in compute service manager 108).

Implementations of the subject technology execute in a distributed fashion and is horizontally scalable unbound by single machine resources such as memory unlike some existing implementations and approaches (e.g., as provided by other programming languages such as Python or R).

Advantages of the subject system described herein include faster execution times along with being more distributable than existing approaches based on Python Pandas Corr function and R Cor function. Other solutions may be implemented as a simple single value correlation of two columns and not an entire table.

Embodiments described herein enable the timely calculation of a correlation on thousands of variables, such that all pairwise combinations of columns in a table can be assessed for correlation which may not have been viable in other existing approaches primarily due to the magnitude the number of columns has on computational complexity of the problem.

In implementations described herein, vector processing engine 240 can distribute vector operations via a user defined table function (UDTF) which is in advantage to other existing analytical tools or databases. For example, such other existing analytical tools may not be able to execute on large tables and other existing databases may not access vector space to make efficient distributed linear algebra and vector operations as provided by embodiments of the subject technology. In addition to meeting a need of running correlation on very wide tables (e.g., for large data sets), the subject technology is highly resource efficient and fast (e.g., reducing execution time) on average sized tables.

Embodiments of the subject technology reduce a Pearson correlation operation(s) to summations and dot products. Using the commutative property of multiplication, the dot products can be chained together effectively calculating multiple results at once. In an implementation, Einstein notation is utilized for advantageous memory and cache usage computing vector multiplications efficiency and requiring less resources. Einstein notation is a notation that simplifies writing summations and products of tensors and vectors. Example features of Einstein notation are:

It uses subscripted indices instead of explicit summations or products. For example, $x_i y_i$ would represent the summation $\Sigma_i x_i y_i$.

Repeated indices are implicitly summed over. For example, $x_i y_i x_j y_j$ would represent $\Sigma_i \Sigma_j x_i y_i x_j y_j$.

Indices only take on values 1, 2, ..., n where n is the dimension of the tensor.

Highly efficient, vector chained operations are successfully distributed across compute resources (e.g., execution nodes provided by a virtual warehouse) via UDTF. UDTFs are utilized as multi-row functions, but the techniques described herein enable access to vector space which is more arbitrary and can necessitate multi-row or multi-column access. The subject system therefore enables distributed vector operations to be spread out across computing resources (e.g., execution nodes) running in parallel that quickly produce covariance and thereby correlation values.

The discussion below describes an example computing architecture showing how vector processing engine 240, along with warehouse scheduling component 140, performs scheduling of vector processing jobs (e.g., via UDTFs) by utilizing a number of execution nodes provided by a given virtual warehouse. After the discussion in FIG. 4, a following discussion in FIG. 5 of example vector computations or vectorized operations that are determined by vector processing engine 240 to enable distributed execution of a vector processing job(s) on a number of execution nodes.

Figure 4:
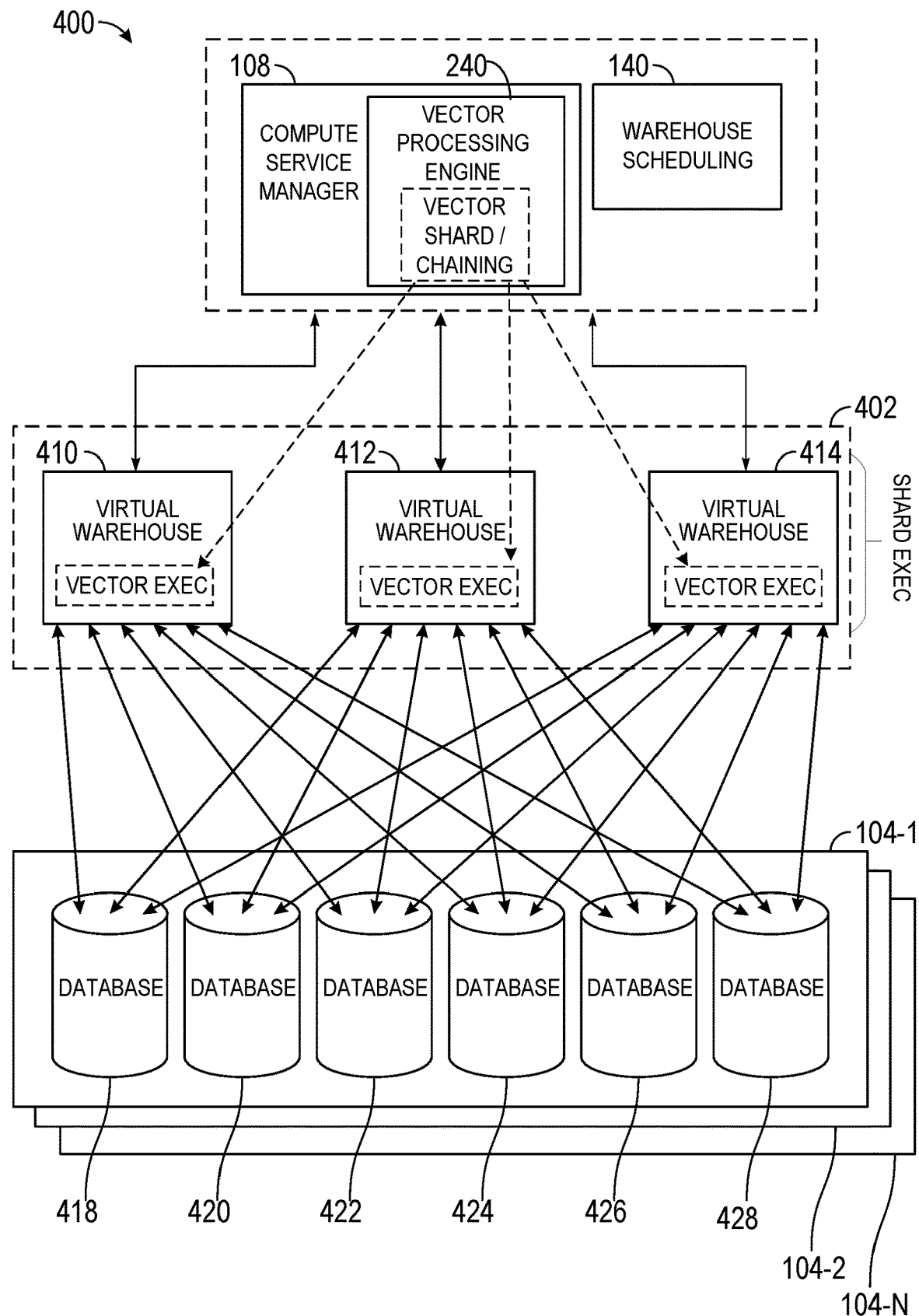
FIG. 4 is a block diagram depicting an embodiment of a computing environment with vector processing engine and warehouse scheduling component with access to multiple virtual warehouses for scheduling jobs (e.g., database queries).

FIG. 4 is a block diagram depicting an embodiment of a computing environment 400 with vector processing engine 240 splits vector representations into chunks and warehouse scheduling component 140 with access to multiple virtual warehouses for vector execution scheduling jobs (e.g., database queries). Environment 400 includes compute service manager 108 with vector processing engine 240, warehouse scheduling component 140, and multiple virtual warehouse 410, virtual warehouse 412, and virtual warehouse 414 arranged in a virtual warehouse group 402. In particular, multiple users can access storage platform 104-1 including database 418, database 420, database 422, database 424, database 426, and database 428 through warehouse scheduling component 140 and virtual warehouse group 402. Although not shown, it is understood that storage platform 104-2 to storage platform 104-N can include any number of databases similar to storage platform 104-1, which multiple users can also access through warehouse scheduling component 140. Moreover, additional virtual warehouse groups can be provided to access such databases included in storage platform 104-2 to storage platform 104-N. In some embodiments, users can access warehouse scheduling component 140 through compute service manager 108.

As illustrated, each virtual warehouse is configured to communicate with any (or all) of database 418, database 420, database 422, database 424, database 426, and database 428.

In an embodiment, each virtual warehouse can be configured to communicate with only a subset of database 418, database 420, database 422, database 424, database 426, and database 428. For example, in computing environment 400, virtual warehouse 410 can be configured to communicate with database 418, database 420, and database 422. Similarly, virtual warehouse 412 can be configured to communicate with database 420, database 424, and database 426. And, virtual warehouse 414 can be configured to communicate with database 422, database 426, and database 428.

Although computing environment 400 shows one virtual warehouse group 402, alternate embodiments may include any number of virtual warehouse groups, each associated with any number of virtual warehouses. For example, different virtual warehouses may be created for each customer or group of users, and for virtual warehouses in different regions. Additionally, different virtual warehouses may be created for different entities, or any other group accessing different data sets. Multiple virtual warehouse groups may have different sizes and configurations. The number of virtual warehouse groups in a particular environment is dynamic and may change based on the changing needs of the users and other systems in the environment.

Users may submit computational requests (e.g., jobs including SQL statements with calls to SQL functions e.g., UDTF, for computing various metrics, and the like) to vector processing engine 240 and using warehouse scheduling component 140, such computational requests are routed to an appropriate virtual warehouse in virtual warehouse group 402 for execution on a number of execution nodes provided by the virtual warehouse. In some implementations, warehouse scheduling component 140 provides a dynamic assignment of such requests to virtual warehouses for execution thereby enabling distributing multiple requests across the virtual warehouses based on available resources (e.g., a number of available execution nodes), and current resource loads, among other types of considerations as discussed further below.

In an implementation, vector processing engine 240 determines a number of execution nodes to execute a given computational request and provides such information to warehouse scheduling component 140. In an embodiment, determining the number of execution nodes (or virtual warehouses) to execute the computational is based at least in part by determining a number of vector shards by vector processing engine 240 as discussed herein in FIG. 5 and FIG. 6 below. In an example, each vector shard can be distributed to a respective execution node (or virtual warehouse) by vector processing engine 240 for vector execution of the vector shard.

After receiving a particular vector shard, each virtual warehouse (or execution node) performs vector execution of the particular vector shard (e.g., shard execution) using a vector processor, provided by a particular execution node, in a single instruction (e.g., vector scalar operation) and returns a result of such execution to vector processing engine 240. In turn, vector processing engine 240 aggregates the set of results based on the result provided by each virtual warehouse (or execution node(s)) and provides the aggregated result as a particular metric(s) as explained further below.

The following discussion relates to distributed correlation, and in particular implementations for enabling distributed execution of vectorized operations to determine a Pearson correlation. Although the following discussion relates to a Pearson correlation, it is appreciated that a Spearman correlation can be implemented using the techniques described for a Pearson correlation in conjunction with some preprocessing operations. Further, other linear algebraic operations can be performed using the techniques described herein including, but not limited to, transpose, and covariance.

Correlation can refer to any statistical relationship between two variables, not just a linear relationship. There are many types of correlation beyond Pearson, such as Spearman rank correlation (as mentioned above) and chi-squared correlation. These can measure non-linear relationships or relationships between non-continuous variables.

In data science applications or scenarios, users (or applications) compute a Pearson correlation (or another type of correlation) to better understand their data set and for feature selection/reduction. In an example, users compute correlation between features and target column to find which features are correlated with the target and/or also compute correlation between features to find which features are highly correlated to remove redundant features.

Pearson correlation is useful for finding linear relationships and associations in many real-world multivariate datasets across various fields and applications. Identifying correlated variables provides insight and improves modeling.

The following are example practical applications of using a Pearson correlation coefficient:

Feature Selection—Finding highly correlated features in a dataset to remove redundant or irrelevant features. Pearson correlation can identify features that are linearly related.

Predictive Modeling—Correlating independent input variables with the target variable can help identify important predictive features to use in modeling. Variables highly correlated with the target are likely good predictors.

Anomaly Detection—Features that are normally highly correlated may indicate an anomaly when their correlation drops significantly. This technique can detect outliers.

Recommender Systems—Measuring correlation between user behaviors, interests and items can help build recommendation engines by identifying similarities.

Network Analysis—Correlation patterns in large networks can identify clusters, associations and central nodes based on connectivity strengths.

Finance—Correlating asset prices and economic factors is key in quantitative analysis to identify risk factors and build predictive models.

Bioinformatics—Finding correlated genes based on expression patterns can help identify functional relationships and regulatory interactions.

Meteorology—Correlating weather measurements from different locations/times helps build models and identify teleconnections.

The following are examples of how Pearson correlation coefficient can be utilized in machine learning applications:

Feature Selection—Pearson correlation can be used to identify and remove redundant or irrelevant features during preprocessing. Highly correlated features indicate one can be removed without significant loss of information.

Algorithm Selection—The correlation coefficient between features and target can indicate suitability of linear vs non-linear algorithms. High correlation implies linear algorithms like linear regression may perform well.

Parameter Tuning—Correlation between hyperparameters and model performance can guide optimal parameter selection during tuning.

Predictive Modeling—Correlating independent variables with dependent target variables highlights important relationships to leverage when training predictive models like regression.

Anomaly Detection—Detect anomalies by monitoring correlation between related variables. Sudden drop in correlation may indicate outlier.

Clustering—Use correlation distance instead of Euclidean distance in clustering algorithms like hierarchical clustering or k-means. Helps group highly correlated data points.

Network Analysis—Correlation patterns in graph data can identify clusters and associations. Useful for social network and biological network analysis.

Feature Engineering—New features can be created using correlations, like ratio of correlated values. Provides additional signals to models.

Multicollinearity Detection—Identify and address multicollinearity issues in regression problems using correlation matrix of independent variables.

For machine learning applications, correlation coefficients are a useful tool for gaining insight into machine learning data and improving model performance.

In an example, Pearson correlation is a specific type of correlation that measures the linear relationship between two continuous variables. It has a value between −1 and 1, with 0 indicating no correlation.

The computational complexity of a correlation's pairwise combinations, combination problem of n choose 2, results in a quadratic time complexity, which can be represented as the following notation:

$$\text{Big } O - O(\Gamma) = n^2$$

As described further below, using summation decomposition to dot products and vector chaining, the time complexity for determining a correlation can be reduced to a linear time complexity, which can be represented as the following notation:

$$\text{Big } O - O(\Gamma) = n$$

Figure 5:
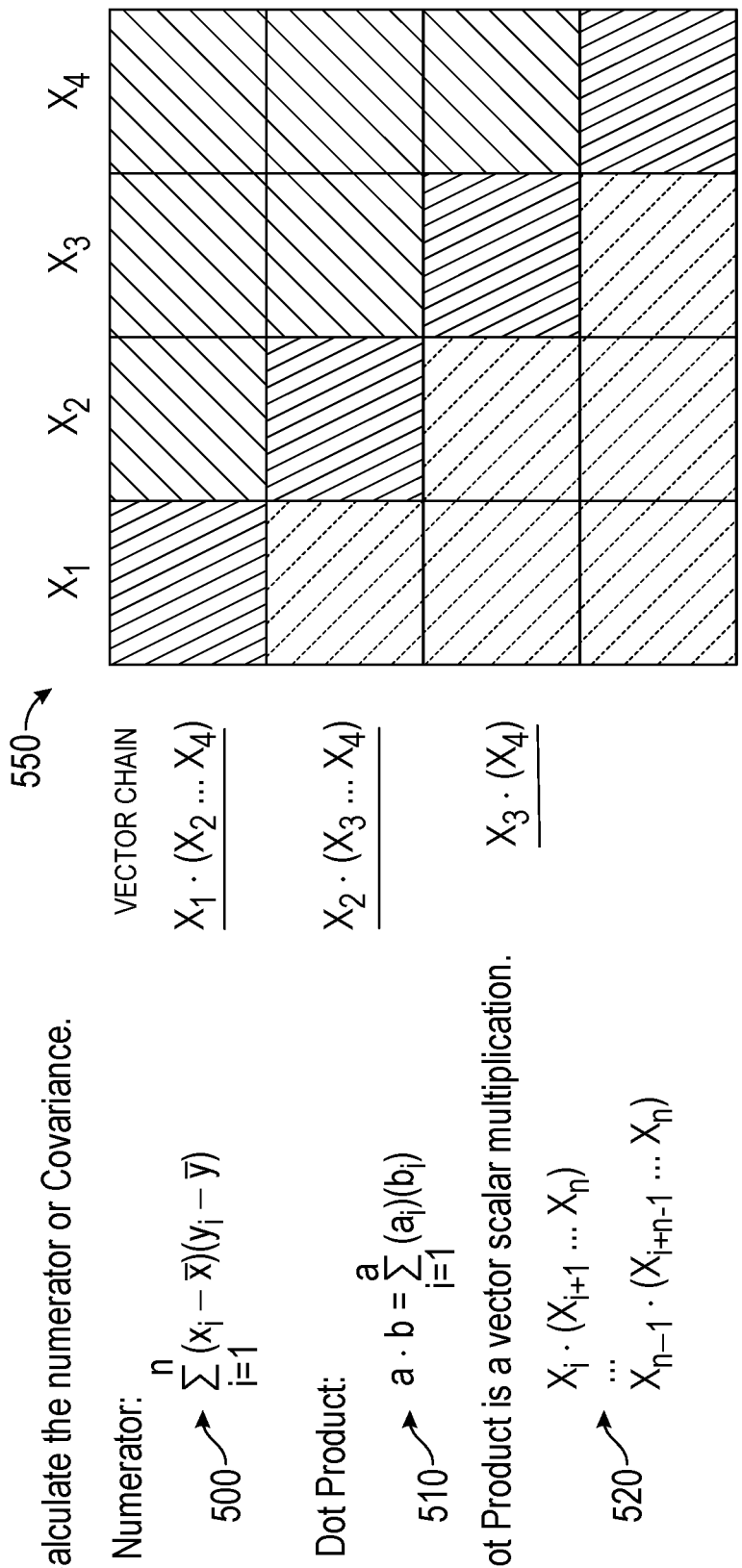
FIG. 5 illustrates examples of determining vectorized operations using summation decomposition to dot products and vector chaining.

FIG. 5 illustrates examples of determining vectorized operations using summation decomposition to dot products and vector chaining.

At least some of the below examples can be performed by vector processing engine 240 in an implementation.

In an example, the subject technology advantageously provides for decomposition of operations that are iterative (e.g., a summation, and the like) to a set of vectorized operations (e.g., for execution by a vector processor(s) shown in at least FIG. 3). One such instance is decomposing a summation to a dot product using a distributive property or distributive property of scalar multiplication as discussed further herein. However, it is appreciated that this is only one example where an operation could be transformed into a vector operation(s) that is suitable for execution by a vector processor(s) which is based on decomposing operations to (more) efficient (e.g., less computationally expensive or intensive) vector operations. In general, the subject technology processes an operation that can be iteratively solved and pushes (e.g., transforms and stores such an operation) it into a vector and thereby enabling (e.g., more efficient and lower computing costs) vector operation(s) to be performed instead.

As shown, a numerator 500 (e.g., a summation corresponding to covariance) of a correlation undergoes a reduction (e.g., a decomposition) that produces a set of dot products 510. From the set of dot products 510, a set of vector scalar multiplications 520 can be determined and utilized (at least in part) to construct matrix 550 (which can be utilized to perform vector sharding to distribute each vector shard to respective virtual warehouses or execution nodes for vector execution).

Reducing calculations to dot products enables advantageous joining of vectors such that only n or number of columns of dot products are utilized to derive a covariance value so that computation complexity is reduced to a linear run time.

As further shown, each row of matrix 550 corresponds to a matrix multiplication for each column. More specifically, a computation to be performed for each row is a dot product of a current variable (e.g., variable i) against a vector including all other subsequent variables (e.g., variable i+1 to n) chained together (e.g., vector chain). In this manner, vector execution (e.g., using the aforementioned vector processor in a given execution node) of a set of vector shards (e.g., each shard corresponding to a particular row of matrix 550) is enabled across multiple virtual warehouses or execution nodes (e.g., each shard is sent to a different virtual warehouse or different execution node), where each virtual warehouse or execution node can execute a particular vector shard in a single instruction using a vector processor (e.g., in a single operation such a vector scalar operation) and thereby decreasing computing resource utilization. In contrast, existing systems that fail to perform a (correct) decomposition operation in the manner described herein (e.g., to determine the aforementioned dot products) instead iteratively determine a summation (e.g., as shown in numerator 500) that is more computationally expensive.

FIG. 6 illustrates examples of notation for determining correlation between two columns of a table.

At least some of the below examples can be performed by vector processing engine 240 in an implementation.

In an example, a Pearson correlation coefficient (PCC)—also referred to as Pearson's r, the Pearson product-moment correlation coefficient (PPMCC), the bivariate correlation, or the correlation coefficient—is a measure of linear correlation between two sets of data. It is the ratio between the covariance of two variables and the product of their standard deviations; thus, it is essentially a normalized measurement of the covariance, such that the result always has a value between −1 and 1.

In an example, a Pearson correlation coefficient ("Pearson correlation"), when applied to a population, is represented by the Greek letter p (rho).

As illustrated, a formula 600 is for a Pearson correlation for X and Y corresponding to two respective columns of a table, where in notation 602 the following is represented:
 cov is the covariance
 σx is the standard deviation of X
 σy is the standard deviation of Y The formula for p can also be expressed in terms of mean and expectation as shown in notation 604, where the following is represented:
 σx is the standard deviation of X
 σy is the standard deviation of Y
 μx is the mean of X
 μy is the mean of Y
 E is the expectation (e.g., expected value of a given variable indicating a probability-weighted average, which describes its central tendency)

As illustrated, notation 622 is a second formula 620 for a Pearson correlation for X and Y corresponding to two respective columns of a table. In an example, second formula 620 can be expressed using a third formula (e.g., third formula 640) as discussed in the following.

As further illustrated, a third formula 640 includes notation 642 expressed using operations corresponding to dot products and sums. For example, E(XY) from second formula 620 is expressed as a dot product ("dot") of X divided by the square root of n and Y divided by the square root of n. Moreover, in an example, E(X) and E(Y) are expressed in terms of a respective sum operation.

In notation 642, n is a number of rows in the data set. In notation 642, dividing by n or a square root of n before doing sum and dot product is to avoid floating point overflow issues.

In an implementation, vector processing engine 240 can utilize a set of UDTFs to distribute each dot product operation and sum operation for processing by execution platform 110 (e.g., using a number of execution nodes in a virtual warehouse). For example, a number of execution nodes can compute values for dot product and sum operations for each shard of rows in a UDTF, and another UDTF is utilized to accumulate the results from each shard. This sharding approach works not just for one pair but also for all pairwise dot and sum computations.

In an example, sharding involves dividing a dataset (or data set) into smaller, more manageable chunks called shards. Each shard contains a subset of the total data, spread across multiple servers or execution nodes. This distributed storage allows for scalability as data grows, and additional execution nodes can be added without disrupting the subject system. Queries and operations can be executed on each shard in parallel thereby improving performance through distributed processing.

To help illustrate the aforementioned sharding approach, given a data set with 1000 rows, and vector processing engine 240 determines that 10 execution nodes are to perform operations for the data set, this would result in 10 shards (e.g., partitions) of rows where each shard includes 100 respective rows from the 1000 rows. For each shard of rows from the 10 shards, a UDTF is sent to a particular execution node (e.g., provided by an appropriate virtual warehouse with sufficient computing resources) to determine dot product and sum operations in formula 640. The outputs of the operations from each shard (e.g., the results of each prior UDTF) are provided in a second UDTF, which is sent to an execution node to accumulate (e.g., perform an aggregate operation) the results from each UDTF for each shard, which in turn generates a Pearson correlation coefficient for the data set based on the accumulated results.

Thus, in an example, each UDTF for a given shard of rows undergo parallel execution in which UDTFs are executed in parallel across multiple execution nodes in a cluster. In this manner, sharding data across execution node instances is enabled for faster processing. Further, the outputs of the operations from each shard then undergo pipeline execution in which output of one UDTF can be piped into the input of another UDTF (e.g., the second UDTF performing the aggregate operation) allowing them to execute in a chained sequence.

Figure 7:
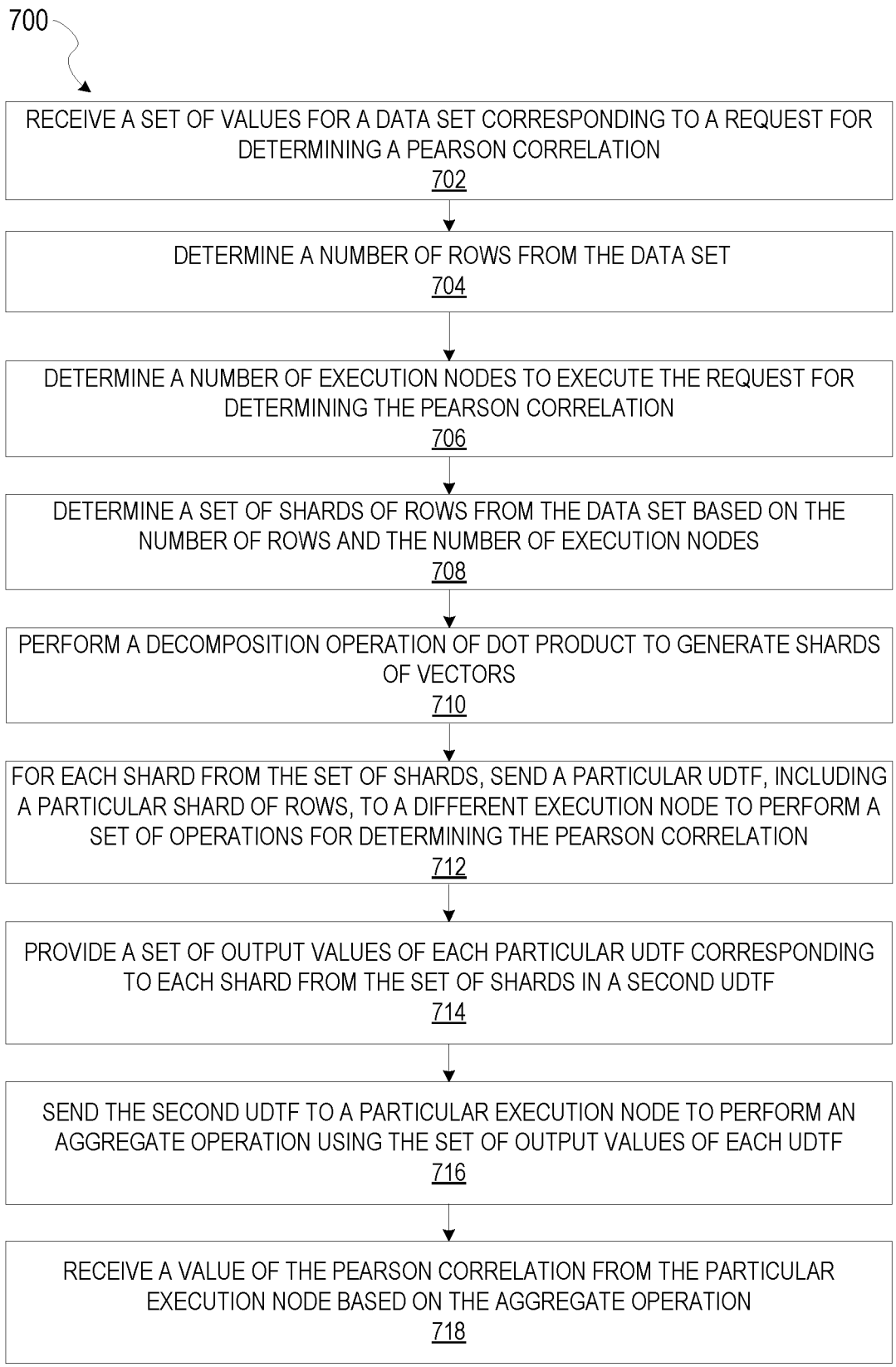
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or warehouse scheduling component 140. Accordingly, the method 700 is described below, by way of example with reference thereto. However, it shall be appreciated that the method 700 may be deployed on various other hardware configurations and is not intended to be limited to deployment within the network-based database system 102.

At operation 702, vector processing engine 240 receives a set of values for a data set corresponding to a request for determining a Pearson correlation.

At operation 704, vector processing engine 240 determines a number of rows from the data set.

At operation 706, vector processing engine 240 determines a number of execution nodes to execute the request for determining the Pearson correlation.

At operation 708, vector processing engine 240 determines a set of shards of rows from the data set based on the number of rows and the number of execution nodes.

At operation 710, vector processing engine 240 performs a decomposition operation on a dot product to generate shards of vectors. Such a decomposition operation on a dot product was discussed in at least FIG. 5 before. In an implementation, operation 710 may be performed in conjunction with operation 708 above in which the shards of vectors correspond to the set of shards.

At operation 712, vector processing engine 240, for each shard from the set of shards, sends a particular user defined table function (UDTF), including a particular shard of rows, to a different execution node to perform a set of operations for determining the Pearson correlation.

At operation 714, vector processing engine 240 provides a set of output values of each particular UDTF corresponding to each shard from the set of shards in a second UDTF.

At operation 716, vector processing engine 240 sends the second UDTF to a particular execution node to perform an aggregate operation using the set of output values of each particular UDTF.

At operation 718, vector processing engine 240 receives a value of the Pearson correlation from the particular execution node based on the aggregate operation.

In an embodiment, determining the number of rows further comprises executing a query on the data set to determine a count of the number of rows In an embodiment, the query comprises a count operation.

In an embodiment, determining the number of execution nodes further comprises determining the number of execution nodes based on a configuration parameter that indicates a maximum number of execution nodes to use for determining the Pearson correlation.

In an embodiment, determining the set of shards further comprises determining a shard size based on dividing the number of rows by the number of execution nodes, the shard size indicating a particular number of rows for including in the particular shard of rows.

In an embodiment, sending the particular UDTF further comprises, for each shard from the set of shards, sending a shard identifier to the different execution node.

In an embodiment, the aggregate operation includes determining a dot product and a square root of a sum of squared values for the particular shard of rows based on the set of output values from the particular UDTFs.

In an embodiment, the aggregate operation includes determining a total sum of values and a total sum of squared values using the set of output values from each particular UDTF.

In an embodiment, vector processing engine 240 performs additional operations including storing the value of the Pearson correlation in a results table; receiving a second request for reading the value of the Pearson correlation in the results table; performing a read operation the value of the Pearson correlation in the results table; and determining whether to remove a set of features from the set of values for the data set based on the value of the Pearson correlation.

In an embodiment, each execution node comprises a different server instance or is included in a different virtual warehouse.

Figure 8:
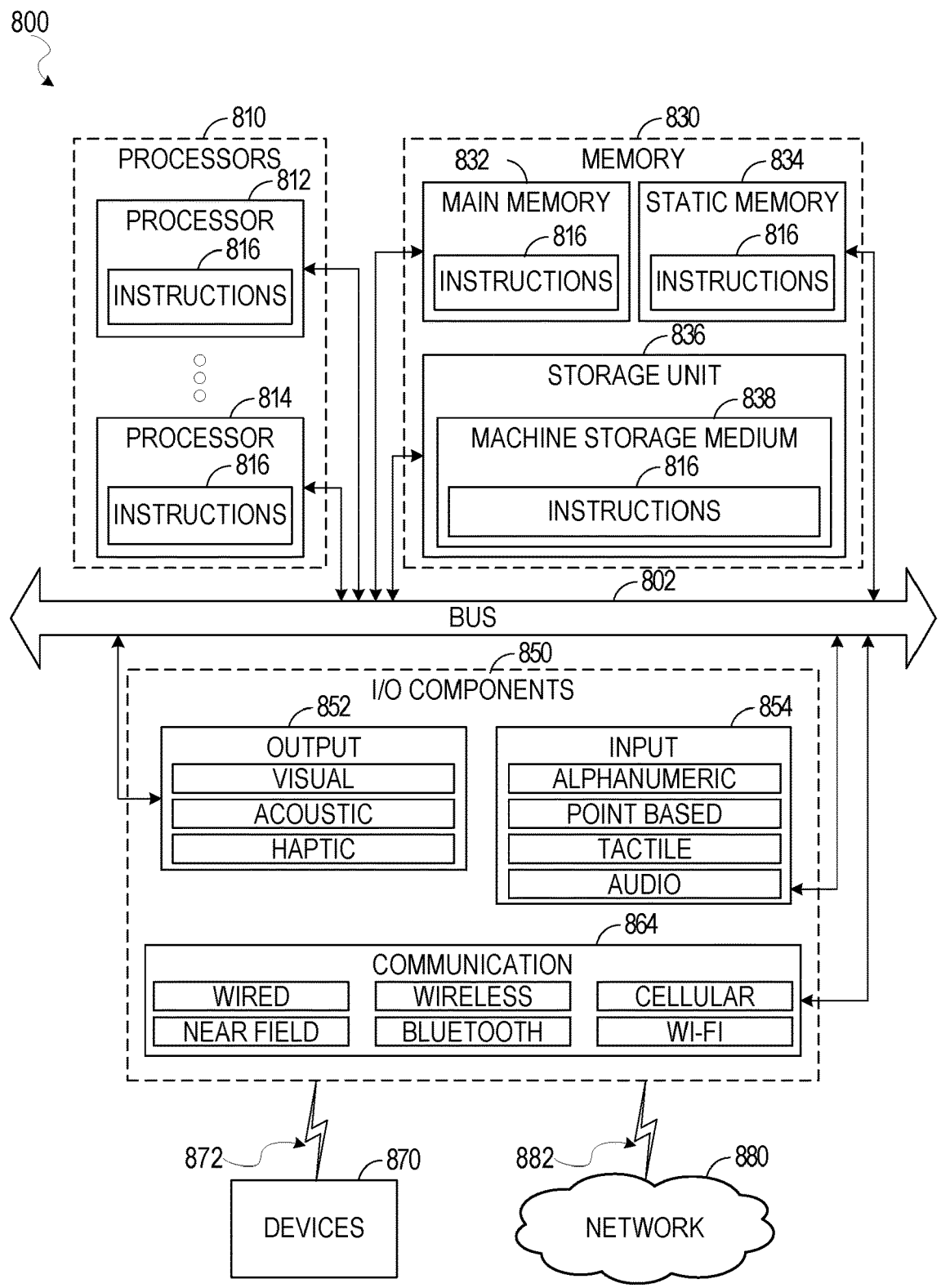
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the methods described above. As another example, the instructions 816 may cause the machine 800 to implement portions of the data flows illustrated herein. In this way, the instructions 816 transform a general, non-programmed machine into a particular machine 800 (e.g., the compute service manager 108 or a node in the execution platform 80) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108 or the execution platform 110, and the devices 870 may include the client device 114 or any other computing device described herein as being in communication with the network-based database system 102 or the cloud storage platform 104-1.

Executable Instructions and Machine Storage Medium

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. The performance of certain of the operations may be distributed among the one or more processors, not only residing within a single machine, but also deployed across a number of machines. In some embodiments, the processor or processors may be located in a single location (e.g., within a home environment, an office environment, or a server farm), while in other embodiments the processors may be distributed across a number of locations.

Conclusion

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   receiving a set of values for a data set corresponding to a request for determining a Pearson correlation;
   determining a number of rows from the data set;
   determining a number of execution nodes to execute the request for determining the Pearson correlation;
   determining a set of shards of rows from the data set based on the number of rows and the number of execution nodes;
   for each shard from the set of shards, sending a particular user defined table function (UDTF), including a particular shard of rows, to a different execution node to perform a set of operations for determining the Pearson correlation;
   providing a set of output values of each particular UDTF corresponding to each shard from the set of shards in a second UDTF;
   sending the second UDTF to a particular execution node to perform an aggregate operation using the set of output values of each particular UDTF; and
   receiving a value of the Pearson correlation from the particular execution node based on the aggregate operation.

2. The system of claim 1, wherein determining the number of rows further comprises:
   executing a query on the data set to determine a count of the number of rows.

3. The system of claim 2, wherein the query comprises a count operation.

4. The system of claim 1, wherein determining the number of execution nodes further comprises:
   determining the number of execution nodes based on a configuration parameter that indicates a maximum number of execution nodes to use for determining the Pearson correlation.

5. The system of claim 1, wherein determining the set of shards further comprises:
   determining a shard size based on dividing the number of rows by the number of execution nodes, the shard size indicating a particular number of rows for including in the particular shard of rows.

6. The system of claim 1, wherein sending the particular UDTF further comprises:
   for each shard from the set of shards, sending a shard identifier to the different execution node.

7. The system of claim 1, wherein the operations further comprise:
   determining a dot product and a square root of a sum of squared values for the particular shard of rows based on the set of output values from the particular UDTF.

8. The system of claim 1, wherein the aggregate operation includes:
   determining a total sum of values and a total sum of squared values using the set of output values from each particular UDTF.

9. The system of claim 1, wherein the operations further comprise:
   storing the value of the Pearson correlation in a results table;
   receiving a second request for reading the value of the Pearson correlation in the results table;
   performing a read operation of the value of the Pearson correlation in the results table; and determining whether to remove a set of features from the set of values for the data set based on the value of the Pearson correlation.

10. The system of claim 1, wherein each execution node comprises a different server instance or is included in a different virtual warehouse.

11. A method comprising:
receiving a set of values for a data set corresponding to a request for determining a Pearson correlation;
determining a number of rows from the data set;
determining a number of execution nodes to execute the request for determining the Pearson correlation;
determining a set of shards of rows from the data set based on the number of rows and the number of execution nodes;
for each shard from the set of shards, sending a particular user defined table function (UDTF), including a particular shard of rows, to a different execution node to perform a set of operations for determining the Pearson correlation;
providing a set of output values of each particular UDTF corresponding to each shard from the set of shards in a second UDTF;
sending the second UDTF to a particular execution node to perform an aggregate operation using the set of output values of each particular UDTF; and
receiving a value of the Pearson correlation from the particular execution node based on the aggregate operation.

12. The method of claim 11, wherein determining the number of rows further comprises:
executing a query on the data set to determine a count of the number of rows.

13. The method of claim 12, wherein the query comprises a count operation.

14. The method of claim 11, wherein determining the number of execution nodes further comprises:
determining the number of execution nodes based on a configuration parameter that indicates a maximum number of execution nodes to use for determining the Pearson correlation.

15. The method of claim 11, wherein determining the set of shards further comprises:
determining a shard size based on dividing the number of rows by the number of execution nodes, the shard size indicating a particular number of rows for including in the particular shard of rows.

16. The method of claim 11, wherein sending the particular UDTF further comprises:
for each shard from the set of shards, sending a shard identifier to the different execution node.

17. The method of claim 11, further comprising:
determining a dot product and a square root of a sum of squared values for the particular shard of rows based on the set of output values from the particular UDTF.

18. The method of claim 11, wherein the aggregate operation includes:
determining a total sum of values and a total sum of squared values using the set of output values from each particular UDTF.

19. The method of claim 11, further comprising:
storing the value of the Pearson correlation in a results table;
receiving a second request for reading the value of the Pearson correlation in the results table;
performing a read operation of the value of the Pearson correlation in the results table; and
determining whether to remove a set of features from the set of values for the data set based on the value of the Pearson correlation.

20. The method of claim 11, wherein each execution node comprises a different server instance or is included in a different virtual warehouse.

21. A non-transitory computer-storage medium comprising instructions that, when executed by one or more processors of a machine, configure the machine to perform operations comprising:
receiving a set of values for a data set corresponding to a request for determining a Pearson correlation;
determining a number of rows from the data set;
determining a number of execution nodes to execute the request for determining the Pearson correlation;
determining a set of shards of rows from the data set based on the number of rows and the number of execution nodes;
for each shard from the set of shards, sending a particular user defined table function (UDTF), including a particular shard of rows, to a different execution node to perform a set of operations for determining the Pearson correlation;
providing a set of output values of each particular UDTF corresponding to each shard from the set of shards in a second UDTF;
sending the second UDTF to a particular execution node to perform an aggregate operation using the set of output values of each particular UDTF; and
receiving a value of the Pearson correlation from the particular execution node based on the aggregate operation.

22. The non-transitory computer-storage medium of claim 21, wherein determining the number of rows further comprises:
executing a query on the data set to determine a count of the number of rows.

23. The non-transitory computer-storage medium of claim 22, wherein the query comprises a count operation.

24. The non-transitory computer-storage medium of claim 21, wherein determining the number of execution nodes further comprises:
determining the number of execution nodes based on a configuration parameter that indicates a maximum number of execution nodes to use for determining the Pearson correlation.

25. The non-transitory computer-storage medium of claim 21, wherein determining the set of shards further comprises:
determining a shard size based on dividing the number of rows by the number of execution nodes, the shard size indicating a particular number of rows for including in the particular shard of rows.

26. The non-transitory computer-storage medium of claim 21, wherein sending the particular UDTF further comprises:
for each shard from the set of shards, sending a shard identifier to the different execution node.

27. The non-transitory computer-storage medium of claim 21, wherein the operations further comprise:
determining a dot product and a square root of a sum of squared values for the particular shard of rows based on the set of output values from the particular UDTF.

28. The non-transitory computer-storage medium of claim 21, wherein the aggregate operation includes:
determining a total sum of values and a total sum of squared values using the set of output values from each particular UDTF.

29. The non-transitory computer-storage medium of claim 21, wherein the operations further comprise:
  storing the value of the Pearson correlation in a results table;
  receiving a second request for reading the value of the Pearson correlation in the results table;
  performing a read operation of the value of the Pearson correlation in the results table; and
  determining whether to remove a set of features from the set of values for the data set based on the value of the Pearson correlation.

30. The non-transitory computer-storage medium of claim 21, wherein each execution node comprises a different server instance or is included in a different virtual warehouse.

* * * * *